(12) United States Patent
Kajouke et al.

(10) Patent No.: US 8,350,523 B2
(45) Date of Patent: Jan. 8, 2013

(54) CHARGING SYSTEM WITH GALVANIC ISOLATION AND MULTIPLE OPERATING MODES

(75) Inventors: Lateef A. Kajouke, San Pedro, CA (US); Milun Perisic, Torrance, CA (US); Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 12/535,994

(22) Filed: Aug. 5, 2009

(65) Prior Publication Data

US 2011/0031927 A1   Feb. 10, 2011

(51) Int. Cl.
  *H02J 7/00*  (2006.01)
(52) U.S. Cl. ......................................... 320/108; 320/140
(58) Field of Classification Search .................. 320/108
  See application file for complete search history.

(56) References Cited

U.S. PATENT DOCUMENTS

| | | | |
|---|---|---|---|
| 4,669,036 A | 5/1987 | Cowett, Jr. | |
| 5,461,297 A | 10/1995 | Crawford | |
| 5,545,971 A * | 8/1996 | Gomez et al. | 323/259 |
| 5,949,659 A * | 9/1999 | Lesche | 363/16 |
| 6,034,513 A | 3/2000 | Farrington et al. | |
| 6,147,886 A | 11/2000 | Wittenbreder | |
| 6,351,397 B1 | 2/2002 | Sawa et al. | |
| 6,538,909 B2 * | 3/2003 | Goodarzi et al. | 363/98 |
| 6,583,519 B2 | 6/2003 | Aberle et al. | |
| 6,989,613 B2 * | 1/2006 | Andrews et al. | 307/130 |
| 6,998,732 B2 * | 2/2006 | Xing et al. | 307/45 |
| 7,330,363 B2 * | 2/2008 | Ponnaluri et al. | 363/71 |
| 7,483,282 B2 | 1/2009 | Kajouke et al. | |
| 7,492,221 B2 | 2/2009 | Lawson et al. | |
| 7,525,296 B2 | 4/2009 | Billig et al. | |
| 7,599,204 B2 | 10/2009 | Kajouke et al. | |
| 7,679,941 B2 * | 3/2010 | Raju et al. | 363/37 |
| 7,764,527 B2 | 7/2010 | Takayanagi | |
| 8,063,606 B2 | 11/2011 | Veselic | |
| 8,199,545 B2 | 6/2012 | Nguyen et al. | |

(Continued)

FOREIGN PATENT DOCUMENTS

DE   102007040550 A1   3/2008

(Continued)

OTHER PUBLICATIONS

Kajouke, L. et al., "Unity Power Factor Isolated Single Phase Matrix Converter Battery Charger," U.S. Appl. No. 12/413,181, filed Mar. 27, 2009.

(Continued)

*Primary Examiner* — Arun Williams
(74) *Attorney, Agent, or Firm* — Ingrassia Fisher & Lorenz, P.C.

(57) ABSTRACT

Systems and methods are provided for operating a charging system with galvanic isolation adapted for multiple operating modes. A vehicle charging system comprises a DC interface, an AC interface, a first conversion module coupled to the DC interface, and a second conversion module coupled to the AC interface. An isolation module is coupled between the first conversion module and the second conversion module. The isolation module comprises a transformer and a switching element coupled between the transformer and the second conversion module. The transformer and the switching element are cooperatively configured for a plurality of operating modes, wherein each operating mode of the plurality of operating modes corresponds to a respective turns ratio of the transformer.

16 Claims, 2 Drawing Sheets

U.S. PATENT DOCUMENTS

| | | | |
|---|---|---|---|
| 2001/0012207 A1* | 8/2001 | Nomura | 363/17 |
| 2001/0026427 A1 | 10/2001 | Mahlein et al. | |
| 2001/0036086 A1 | 11/2001 | Pascu et al. | |
| 2002/0044468 A1 | 4/2002 | Goodarzi et al. | |
| 2003/0102718 A1 | 6/2003 | Hockney et al. | |
| 2004/0026929 A1 | 2/2004 | Rebsdorf et al. | |
| 2004/0041543 A1 | 3/2004 | Brooks et al. | |
| 2004/0066663 A1 | 4/2004 | Raichle | |
| 2004/0119449 A1* | 6/2004 | Matley | 323/234 |
| 2004/0257271 A1 | 12/2004 | Jacobson et al. | |
| 2007/0035265 A1 | 2/2007 | Balog, Jr. et al. | |
| 2007/0139975 A1 | 6/2007 | Yamauchi et al. | |
| 2007/0274109 A1 | 11/2007 | Oyobe et al. | |
| 2008/0013351 A1 | 1/2008 | Alexander | |
| 2008/0055938 A1 | 3/2008 | Kajouke et al. | |
| 2008/0055954 A1 | 3/2008 | Kajouke et al. | |
| 2008/0130339 A1* | 6/2008 | McDonald et al. | 363/127 |
| 2009/0033393 A1 | 2/2009 | Park et al. | |
| 2009/0251938 A1 | 10/2009 | Hallak | |
| 2009/0322287 A1 | 12/2009 | Ozeki et al. | |
| 2010/0103703 A1 | 4/2010 | Nishiyama et al. | |
| 2011/0032732 A1 | 2/2011 | Hsu | |
| 2011/0080151 A1 | 4/2011 | Rahardjo et al. | |
| 2011/0089928 A1 | 4/2011 | O'Gorman et al. | |

FOREIGN PATENT DOCUMENTS

| | | |
|---|---|---|
| GB | 2459542 A | 11/2009 |
| JP | 2008306855 A | 12/2008 |

OTHER PUBLICATIONS

Kajouke, L., "Systems and Methods for Bi-Directional Energy Delivery With Galvanic Isolation," U.S. Appl. No. 12/535,975, filed Aug. 5, 2009.

Office Action, dated Oct. 5, 2011, for U.S. Appl. No. 12/413,181.

German Office Action, dated Mar. 21, 2012, for German Patent Application No. 10 2011 085 063.5.

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

U.S. Office Action, dated Nov. 25, 2011, for U.S. Appl. No. 12/622,088.

German Office Action, dated Jan. 27, 2012, for German Patent Application No. 10 2010 031 615.6.

Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

Ransom R.M., et al. "Systems and Methods for Commutating Inductor Current Using a Matrix Converter," U.S. Appl. No. 12/622,088, filed Nov. 19, 2009.

Ransom, R.M., "Systems and Methods for Deactivating a Matrix Converter," U.S. Appl. No. 12/725,265, filed Mar. 16, 2010.

Kajouke, L.A., et al., "Systems and Methods for Reducing Transient Voltage Spikes in Matrix Converters," U.S. Appl. No. 12/839,134, filed Jul. 19, 2010.

Perisic, M., et al. "Compensation for Electrical Converter Nonlinearities," U.S. Appl. No. 12/941,552, filed Nov. 8, 2010.

Perisic, M., et al. "Systems and Methods for Providing Power to a Load Based Upon a Control Strategy," U.S. Appl. No. 12/949,439, filed Nov. 18, 2010.

Ransom, Ray., et al. "Systems and Methods for Initializing a Charging System," U.S. Appl. No. 13/149,484, filed May 31, 2011.

Perisic, M., et al. "Compensation for Electrical Converter Nonlinearities," U.S. Appl. No. 12/941,521, filed Nov. 8, 2010.

Kajouke, L.A., et al. "Systems and Methods for Reducing Harmonic Distortion in Electrical Converters," U.S. Appl. No. 12/941,488, filed Nov. 8, 2010.

Delorme, Gilles M., et al. "Methods and Systems for Controlling Vehicle Defrost Units," U.S. Appl. No. 12/871,664, filed Aug. 30, 2010.

Kajouke, L.A., et al. "Discharging a DC Bus Capacitor of an Electrical Converter System," U.S. Appl. No. 13/090,911, filed Apr. 20, 2011.

Perisic, M., et al. "Systems and Methods for Providing Power to a Load Based Upon a Control Strategy," U.S. Appl. No. 13/222,961, filed Aug. 31, 2011.

U.S. Office Action, dated Feb. 8, 2012, for U.S. Appl. No. 12/535,975.

USPTO, U.S. "Final Office Action" mailed May 10, 2012, for U.S. Appl. No. 12/413,181, filed Mar. 27, 2009.

USPTO, U.S. "Notice of Allowance" mailed Jun. 11, 2012, for U.S. Appl. No. 12/622,088, filed Nov. 19, 2009.

Office Action, dated Jul. 23, 2012, for U.S. Appl. No. 12/725,265.

Final Office Action, dated Aug. 2, 2012, for U.S. Appl. No. 12/535,975.

Office Action, dated Aug. 29, 2012, for U.S. Appl. No. 12/839,134.

Office Action, dated Oct. 24, 2012, for U.S. Appl. No. 12/941,552.

Office Action, dated Nov. 9, 2012, for U.S. Appl. No. 12/949,439.

Notice of Allowance, dated Nov. 15, 2012, for U.S. Appl. No. 12/725,265.

Notice of Allowance, dated Nov. 16, 2012, for U.S. Appl. No. 12/535,975.

\* cited by examiner

CHARGING SYSTEM WITH GALVANIC ISOLATION AND MULTIPLE OPERATING MODES

STATEMENT REGARDING FEDERALLY SPONSORED RESEARCH OR DEVELOPMENT

This invention was made with Government support under DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to charging systems providing galvanic isolation in conjunction with multiple operating modes.

BACKGROUND

It is desirable that charging systems for electric and/or hybrid vehicles accommodate delivery of high power over wide range of operating input/output voltages, while at the same time achieving galvanic isolation, unity power factor, low harmonic distortion, high power density and low cost. Many charging systems employ a two power stage design. The first power stage includes a wide input voltage range unity power factor boost converter that provides an output voltage higher than the voltage of the energy source being charged. The second stage provides galvanic isolation and processes the voltage and current to an acceptable level for the energy source being charged. However, using two power stages is inefficient (e.g., in terms of component size, power consumption, and cost) and inflexible, that is, the two power stage charging systems often accommodate a particular combination of voltages for the two energy sources.

BRIEF SUMMARY

In accordance with one embodiment, an apparatus is provided for a charging system. The charging system comprises a first conversion module, a second conversion module, and an isolation module coupled between the first conversion module and the second conversion module. The isolation module provides galvanic isolation between the first conversion module and the second conversion module. The isolation module is configured for a plurality of operating modes, wherein each operating mode of the plurality of operating modes corresponding to a respective turns ratio for the isolation module.

In accordance with another embodiment, a method is provided for charging a DC energy source from an AC energy source using a charging system configured for a plurality of operating modes. The charging system includes an isolation module providing galvanic isolation between the DC energy source and the AC energy source, wherein each operating mode of the plurality of operating modes corresponds to a respective turns ratio for the isolation module. The DC energy source has a DC voltage and the AC energy source has an AC voltage. The method comprises identifying a first operating mode of the plurality of operating modes based on the DC voltage and the AC voltage, configuring the isolation module for a first turns ratio associated with the first operating mode in response to identifying the first operating mode, and operating the charging system in accordance with the first operating mode.

In another embodiment, an apparatus is provided for a vehicle charging system. The vehicle charging system comprises a DC interface, an AC interface, a first conversion module coupled to the DC interface, and a second conversion module coupled to the AC interface. An isolation module is coupled between the first conversion module and the second conversion module. The isolation module comprises a transformer and a switching element coupled between the transformer and the second conversion module. The transformer and the switching element are cooperatively configured to for a plurality of operating modes, wherein each operating mode of the plurality of operating modes corresponds to a respective turns ratio of the transformer.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
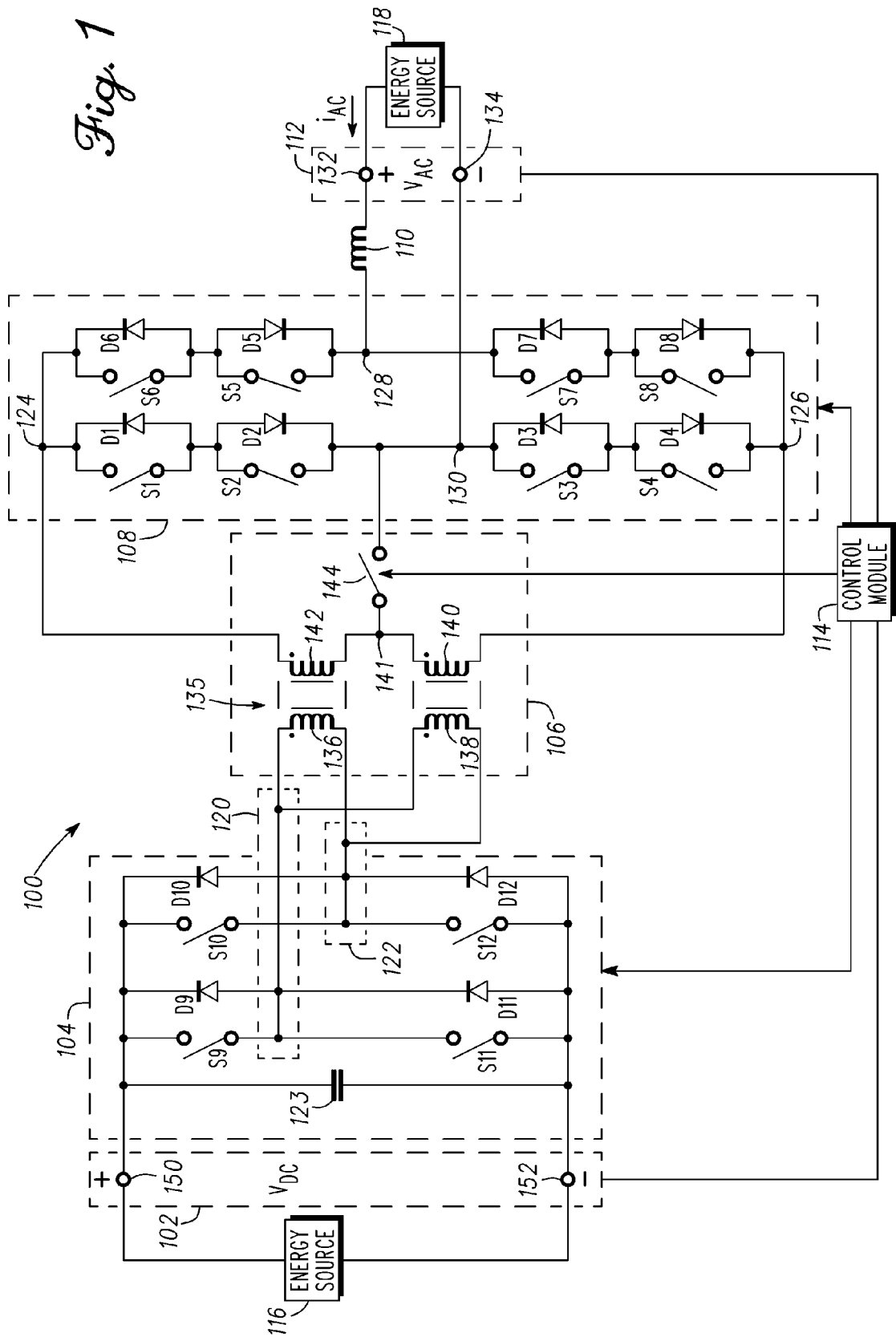
FIG. 1 is a schematic view of a charging system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present.

Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

For the sake of brevity, conventional techniques related to electrical energy and/or power conversion, electrical charging systems, power converters, transformer construction and/or design, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to a charging system capable of multiple operating modes that accommodates a wide range of voltage combinations while simultaneously achieving unity power factor, galvanic isolation, low harmonic distortion, and high power density. The charging system may be used to charge a DC energy source, for example, a rechargeable battery in an electric and/or hybrid vehicle, from an AC energy source, such as, for example, the mains electrical supply.

FIG. 1 depicts an exemplary embodiment of a charging system 100 (or alternatively, a charger or charging module) suitable for use in a vehicle, such as, for example, an electric and/or hybrid vehicle. The charging system 100 includes, without limitation, a first interface 102, a first conversion module 104, an isolation module 106, a second conversion module 108, an inductor 110, a second interface 112, and a control module 114. In an exemplary embodiment, the control module 114 is coupled to the conversion modules 104, 108 and the isolation module 106 and configured to operate the conversion modules 104, 108 and the isolation module 106 in a manner that achieves a desired power flow from an AC energy source 118 coupled to the second interface 112 to a DC energy source 116 coupled to the first interface 102, as described in greater detail below.

It should be understood that FIG. 1 is a simplified representation of a charging system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner.

In an exemplary embodiment, the first interface 102 is coupled to the first conversion module 104 which, in turn, is coupled to the isolation module 106. The isolation module 106 is coupled to the second conversion module 108 which, in turn, is coupled to the inductor 110 which is coupled to the AC interface 112. In an exemplary embodiment, the control module 114 is coupled to the interfaces 102, 112 and the conversion modules 104, 108. The first interface 102 generally represents the physical interface (e.g., terminals, connectors, and the like) for coupling the charging system 100 to a DC energy source 116. The DC energy source 116 (or alternatively, the energy storage source or ESS) is capable of receiving a direct current from the charging system 100 at a particular DC voltage level ($V_{DC}$). In accordance with one embodiment, the DC energy source 116 is a rechargeable high-voltage battery pack capable of storing regenerative energy. In other embodiments, the DC energy source 116 may comprise a battery, a fuel cell, an ultracapacitor, or another suitable energy storage device. In this regard, the DC energy source 116 may comprise the primary energy source for an electrical system and/or an electric motor in a vehicle. For example, the DC energy source 116 may be coupled to a power inverter coupled to the electric motor and configured to drive the electric motor via the power inverter. In an exemplary embodiment, the DC energy source 116 has a nominal DC voltage range from about 200 to 500 Volts DC.

In a similar manner, the second interface 112 generally represents the physical interface (e.g., terminals, connectors, and the like) for coupling the charging system 100 to an AC energy source 118. The AC energy source 118 (or power source) is capable of providing an AC current ($i_{AC}$) to the charging system 100 at a particular AC voltage level ($V_{AC}$). In an exemplary embodiment, the AC energy source 118 is realized as a main power supply or main electrical system for a building, residence, or another structure within an electric power grid (e.g., mains electricity or grid power). In accordance with one embodiment, the AC energy source 118 comprises a single-phase power supply, as is common to most residential structures, which varies depending on the geographic region. For example, in the United States, the AC energy source 118 may be realized as 120 Volts (RMS) or 240 Volts (RMS) at 60 Hz, while in other regions the AC energy source 118 may be realized as 110 Volts (RMS) or 220 Volts (RMS) at 50 Hz. In alternative embodiments, the AC energy source 118 may be realized as any AC energy source suitable for operation with the charging system 100.

In an exemplary embodiment, the first conversion module 104 converts high-frequency energy from the isolation module 106 at nodes 120, 122 to DC energy that is provided to the DC energy source 116. In this regard, the first conversion module 104 operates as a rectifier when converting high frequency AC energy to DC energy, as will be appreciated in the art. In the illustrated embodiment, the first conversion module 104 comprises four switches (S9-S12) with each switch having a diode (D9-D12) configured antiparallel to the respective switch. In an exemplary embodiment, the switches (S9-S12) are transistors, and may be realized using any suitable semiconductor transistor switch, such as a bipolar junction transistor (e.g., an IGBT), a field-effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 116 for charging the DC energy source 116 when the respective switch is off while the switches are modulated (e.g., opened and/or closed).

In an exemplary embodiment, the first conversion module 104 operates as a full-wave bridge rectifier using diodes (D9-D12) to convert high-frequency AC voltage at nodes 120, 122 to a desired DC voltage level ($V_{DC}$) at the DC interface 102. In this regard, diode D9 is coupled between node 120 and a first node 150 of the DC interface 102 and configured to provide a path for current flow from node 120 to node 150, diode D11 is coupled between node 120 and a second node 152 of the DC interface 102 and configured to provide a path for current flow from node 152 to node 120, diode D10 is coupled between node 122 and node 150 and configured to provide a path for current flow from node 122 to node 150, and diode D12 is coupled between node 122 and node 152 and configured to provide a path for current flow from node 152 to node 122. As shown, the first conversion module 104 also includes a capacitor 123 configured electrically in parallel across the DC interface 102 to reduce voltage ripple at the DC interface 102, as will be appreciated in the art.

In an exemplary embodiment, the second conversion module 108 (or alternatively, matrix conversion module) facilitates the flow of current (or energy) from the AC energy source 118 to nodes 124, 126 which are coupled to the isolation module 106, as described in greater detail below. In the illustrated embodiment, the second conversion module 108 is realized as a front end unity power factor single-phase matrix converter comprising eight switches (S1-S8) with each switch having a diode (D1-D8) configured antiparallel to the respective switch, in a similar manner as set forth above in regards to the first conversion module 104.

As shown in FIG. 1, a first set of switches (S1, S2) and diodes (D1, D2) are coupled between node 130 and node 124 of the second conversion module 108 (or alternatively, matrix conversion module), with the first pair of switch and antiparallel diode (e.g., S1 and D1) being configured with opposite polarity as the second pair of switch and antiparallel diode (e.g., S2 and D2). Switch S1 and diode D2 are configured to provide a path for current flow from node 124 through switch S1 and diode D2 to node 130 when switch S1 is closed (or ON) and the voltage from node 124 to node 130 is positive (or the voltage from node 130 to node 124 is negative), and switch S2 and diode D1 are configured to provide a path for current flow from node 130 through switch S2 and diode D1 to node 124 when switch S2 is closed (or ON) and the voltage from node 124 to node 130 is negative (or the voltage from node 130 to node 124 is positive). In a similar manner, a second set of switches (S3, S4) and diodes (D3, D4) are coupled between node 130 and node 126, a third set of switches (S5, S6) and diodes (D5, D6) are coupled between node 128 and node 124, a fourth set of switches (S7, S8) and diodes (D7, D8) are coupled between node 128 and node 126.

As described in greater detail below, in an exemplary embodiment, the switches (S1-S8) are modulated (e.g., opened and/or closed) based on the voltage levels at the interfaces 102, 112 (e.g., the voltages of the energy sources 116, 118) of the charging system 100 in a manner that either boosts (or steps-up) or bucks (or steps-down) the voltage from the AC energy source 118 to provide a charging current at a desired voltage level ($V_{DC}$) at the DC interface 102. In an exemplary embodiment, the switches (S1-S8) of the matrix conversion module 108 are modulated in a manner such that the input current ($i_{AC}$) from the AC energy source 118 is in phase with the AC voltage ($V_{AC}$) that is, the charging system 100 operates with unity power factor (within realistic and/or practical operating tolerances) at the AC interface 112. In an exemplary embodiment, the inductor 110 is configured electrically in series between a first node 132 of the AC interface 112 and node 128 of the matrix conversion module 108 while a second node 134 of the AC interface 112 is coupled to node 130 of the matrix conversion module 108. The inductor 110 functions as a high-frequency inductive energy storage element during operation of the charging system 100, as described in greater detail below.

In an exemplary embodiment, the isolation module 106 provides galvanic isolation between the two conversion modules 104, 108. In the illustrated embodiment, the isolation module 106 is realized as a transformer 135 configurable for a plurality of different turns ratios. In an exemplary embodiment, the transformer 135 is realized as a high-frequency transformer, that is, a transformer designed for a particular power level at a high-frequency, such as the switching frequency of the switches of the conversion modules 104, 108 (e.g., 50 kHz), such that the physical size of the transformer is reduced relative to a transformer designed for the same power level at a lower frequency (e.g., the mains frequency). As used herein, the turns ratio of the isolation module 106 and/or transformer 135 should be understood as referring to the ratio of the effective number of winding turns in the secondary winding stage (e.g., windings 136, 138) of the transformer 135 the effective number of winding turns in the primary winding stage (e.g., windings 140, 142) of the transformer 135, or alternatively, the voltage across nodes 120, 122 to the voltage across nodes 124, 126, 141. It will be appreciated in the art that in response to a high frequency voltage at nodes 124, 126, 141 the isolation module 106 generates a high frequency voltage at nodes 120, 122 with a magnitude based on the turns ratio of the transformer 135, such that a larger turns ratio produces a voltage with a greater magnitude at nodes 120, 122 while a smaller turns ratio produces a voltage with a lesser magnitude at nodes 120, 122.

In an exemplary embodiment, the charging system 100 and/or isolation module 106 is configured for a plurality of operating modes, with each operating mode corresponding to a different turns ratio of the plurality of different turns ratios for the transformer 135. It should be noted that although the isolation module 106 and/or transformer 135 may be described herein in the context of a charging system 100 and/or isolation module 106 configured for two operating modes (or two different turns ratios), it will be appreciated that the charging system 100 and/or isolation module 106 may be adapted for any number of operating modes and/or turns ratios. In this regard, the operating modes and/or turns ratios will depend on the particular application and the expected combinations and/or ranges of voltage levels at the respective interfaces 102, 112 of the charging system 100. In other words, the turns ratios of the isolation module 106 and/or transformer 135 may be configured for numerous possible combinations of energy sources 116, 118 and/or voltage levels.

In an exemplary embodiment, the isolation module 106 comprises a first set of windings 136 connected between nodes 120, 122 of the first conversion module 104, a second set of windings 138 connected between nodes 120, 122, a third set of windings 140 connected between node 126 and node 141, and a fourth set of windings 142 connected between node 124 and node 141. For purposes of explanation, the sets of windings 140, 142 may be referred to herein as comprising the primary winding stage (or primary windings)

of the transformer 135 and the sets of windings 136, 138 may be referred to herein as comprising the secondary winding stage (or secondary windings). The primary windings 140, 142 are magnetically coupled to the secondary windings 136, 138 in a conventional manner, as will be appreciated in the art.

In an exemplary embodiment, a switching element 144 is connected between node 141 of the primary winding stage of the isolation module 106 and node 130 of the matrix conversion module 108. In this regard, the third set of windings 140 and the fourth set of windings 142 are configured electrically in series when the switching element 144 is open (or OFF), while the first set of windings 136 and the second set of windings 138 are configured electrically in parallel. Thus, when the switching element 144 is closed (or ON), the effective number of winding turns of the primary windings stage of the transformer 135 (e.g., the effective number of turns of primary windings 140, 142) is reduced, such that closing (or turning ON) the switching element 144 increases the turns ratio of the isolation module 106 and/or transformer 135. Conversely, when the switching element 144 is opened (or turned OFF), the two sets of primary windings 140, 142 are in series and the two sets of secondary windings 136, 138 are in parallel, such that opening the switching element 144 decreases the turns ratio of the isolation module 106 and/or transformer 135. The switching element 144 may be realized using a suitable semiconductor transistor switch, such as a bipolar junction transistor (e.g., an IGBT), a field-effect transistor (e.g., a MOSFET), or any other comparable device known in the art. As set forth above, it should be appreciated that the isolation module 106 and/or transformer 135 may be adapted to include additional sets of windings and additional switching elements to accommodate any number of turns ratios and/or operating modes. In this regard, it should be noted that number of winding turns in the sets of windings 136, 138, 140, 142 may be modified depending on the needs of a particular application, and the subject matter is not intended to be limited to any particular configuration or number of winding turns.

The control module 114 generally represents the hardware, firmware and/or software configured to modulate the switches of the conversion modules 104, 108 to achieve a desired power flow between the DC energy source 116 and the AC energy source 118, as described in greater detail below. The control module 114 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein. In an exemplary embodiment, the control module 114 is coupled to the interfaces 102, 112 and the switching element 144, and the control module 114 activates (e.g., opens or closes) the switching element 144 based on the voltage levels at the interfaces 102, 112, as described in greater detail below.

Figure 2:
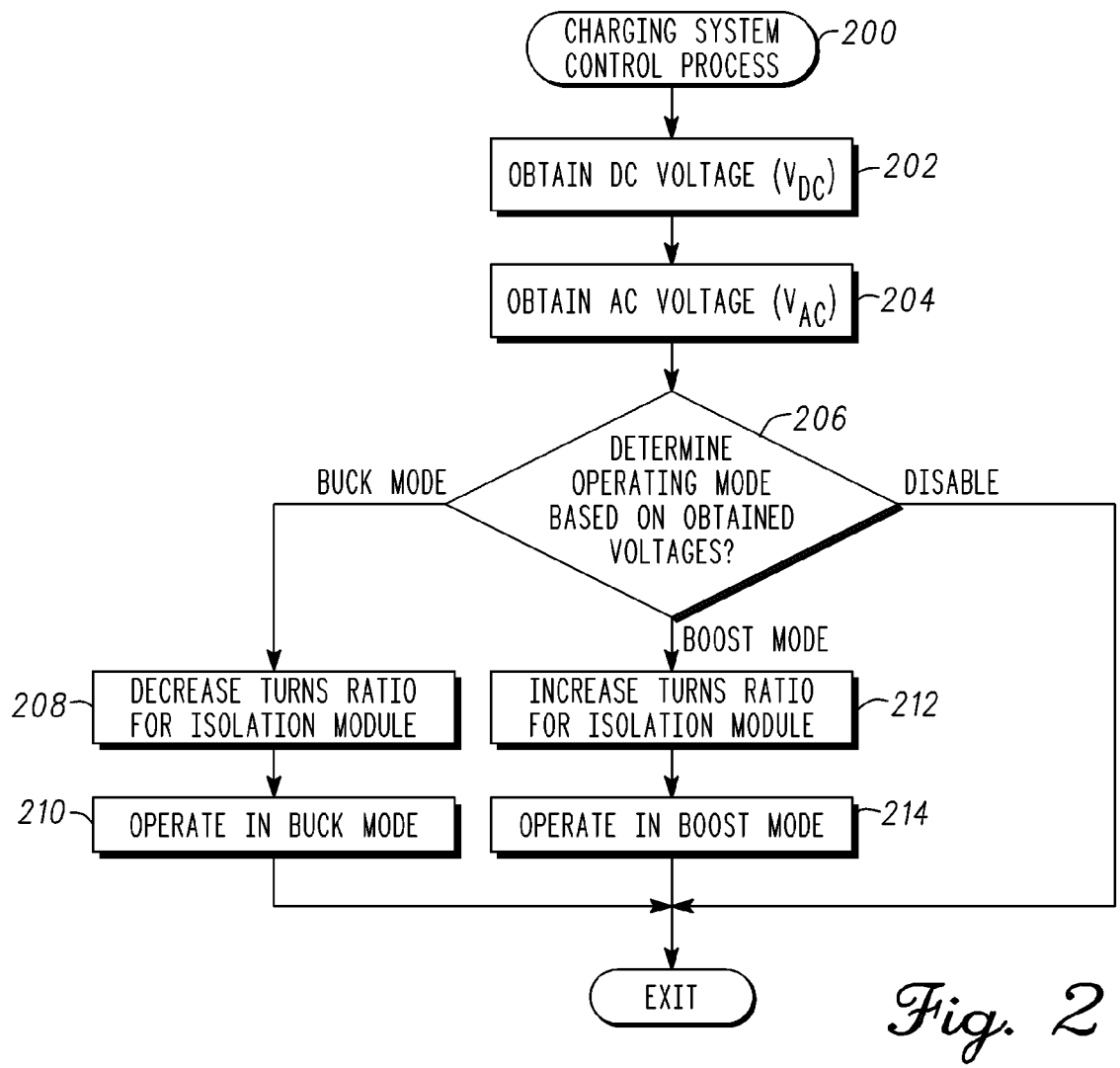
FIG. 2 is a flow diagram of charging system control process suitable for use with the charging system of FIG. 1 in accordance with one embodiment.

Referring now to FIG. 2, in an exemplary embodiment, a charging system may be configured to perform a charging system control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the first conversion module 104, the isolation module 106, the matrix conversion module 108, and/or the control module 114. It should be appreciated that any number of additional or alternative tasks may be included, and may be incorporated into a more comprehensive procedure or process having additional functionality not described in detail herein.

Referring to FIG. 2, and with continued reference to FIG. 1, a charging system control process 200 may be performed to allow a charging system 100 to accommodate a wide range of voltages (e.g., at interfaces 102, 112) or a number of combinations of energy source voltages. In an exemplary embodiment, the charging system control process 200 begins by obtaining the desired voltage level at the DC interface (task 202). In accordance with one embodiment, the desired voltage level at the DC interface 102 corresponds to the voltage level of the DC energy source 116. For example, the control module 114 may obtain the voltage level of the DC energy source by obtaining the DC voltage ($V_{DC}$) at the DC interface 102 of the charging system 100 (e.g., via a suitably configured sensing arrangement). In alternative embodiments, the desired voltage level at the DC interface 102 may be predetermined and stored in the control module 114, or the desired voltage level at the DC interface 102 selected by a user and provided to the control module 114 and/or charging system 100. The charging system control process 200 continues by obtaining the voltage level of the AC energy source (task 204). For example, the control module 114 may obtain the voltage level of the AC energy source by obtaining and/or calculating the root mean square (RMS) of the AC voltage ($V_{AC}$) at the AC interface 112 of the charging system 100.

In an exemplary embodiment, the charging system control process 200 continues by determining and/or identifying an appropriate operating mode for the charging system based on the obtained voltage levels for the interfaces of the charging system (task 206). In this regard, the charging system control process 200 and/or control module 114 determines the appropriate turns ratio for the isolation module 106 and implements the appropriate control scheme for the matrix conversion module 108 based on the ratio of the desired DC voltage at the DC interface 102 ($V_{DC}$) to the AC voltage at the AC interface 112 ($V_{AC}$). In an exemplary embodiment, the charging system control process 200 determines whether to operate the charging system in a buck mode or a boost mode based on the ratio of the DC voltage to the AC voltage. In this regard, a buck mode corresponds to operation of the charging system 100 when the turns ratio of the isolation module 106 is configured to be less than 1:1 while a boost mode corresponds to operation of the charging system 100 when the turns ratio of the isolation module 106 is configured to be greater than or equal to 1:1. In an exemplary embodiment, the charging system control process 200 may also determine to disable operation of the charging system based on the ratio of the DC voltage to the AC voltage, as described in greater detail below.

In an exemplary embodiment, the charging system control process 200 and/or control module 114 determines to operate the charging system 100 in a buck mode when the ratio of the DC voltage ($V_{DC}$) at the DC interface 102 to the AC voltage ($V_{AC}$) at the AC interface 112 is such that the turns ratio of the isolation module 106 should be decreased in order to step-down or buck the AC voltage ($V_{AC}$) at the AC interface 112 to achieve the desired DC voltage ($V_{DC}$) at the DC interface 102. In accordance with one embodiment, the control module 114 determines to operate the charging system 100 in a buck mode when the peak voltage of the AC voltage ($V_{AC}$) at the AC interface 112 is greater than the desired DC voltage ($V_{DC}$) at the DC interface 102, in other words, when $\sqrt{2} \times V_{AC} \geq V_{DC}$ where $V_{AC}$ is the RMS voltage at the AC interface 112. For example, in accordance with one embodiment, the charging system 100 may be designed to accommodate an AC energy source voltage ($V_{AC}$) of either 120 Volts (RMS) or 240 Volts (RMS) for a nominal DC voltage of the DC energy source 116 (or desired DC voltage level) of about 250 Volts DC. Each set of windings 136, 138, 140, 142 may have the same number of winding turns, such that the turns ratio of the isolation module 106 and/or transformer 135 is 1:2 when the switching element 144 is open and 1:1 when the switching element 144 is closed. In this regard, when the RMS voltage of the AC energy source 118 is 240 Volts, the control module 114 may determine that the charging system 100 should be operated in a buck mode to step-down the AC voltage ($V_{AC}$) to the desired DC voltage level ($V_{DC}$).

In response to identifying the buck mode as the appropriate operating mode, the charging system control process 200 continues by decreasing the turns ratio of the isolation module and operating the charging system in the buck mode (tasks 208, 210). In this regard, in an exemplary embodiment, the control module 114 configures the isolation module 106 for the buck mode by opening (or turning OFF) the switching element 144, such that the turns ratio of the isolation module 106 is decreased to a ratio less than 1:1. The control module 114 utilizes high-frequency pulse-width modulation (PWM) to modulate or otherwise operate the switches of the matrix conversion module 108 such that the configuration of the matrix conversion module 108 and isolation module 106 operates as a high-frequency full bridge step-down unity power factor matrix converter to provide the desired voltage at the output 120, 122 of the secondary windings 136, 138. The control module 114 implements the appropriate switching pattern and/or state machine and cycles the switches (S1-S8) sequentially through states of the state machine during a switching interval which is equal to the inverse of the switching frequency ($f_s$). The control module 114 generates a sinusoidal pulse width modulated (PWM) variable duty cycle control signal that controls the state machine transitions, and thereby, the duty cycle of the switches (S1-S8).

In accordance with one embodiment, the voltage at the DC interface 102 is sampled and compared with a reference voltage (e.g., the desired voltage the DC interface 102) to obtain an error signal that is compared with high frequency carrier signal that corresponds to the switching frequency ($f_s$) to obtain the sinusoidal PWM modulated duty cycle. The control module 114 operates the switches (S1-S8) to cycle energy through the matrix conversion module 108 when the error signal is less than the carrier signal by applying an AC voltage across the inductor 110. When the error signal is greater than the carrier signal, the control module 114 operates the switches (S1-S8) to release the stored energy and/or voltage of the inductor 110 (alternatively, the fly-back voltage). The sum of the fly-back voltage and the AC voltage is applied to the isolation module 106, resulting in a power transfer to nodes 120, 122 and/or DC energy source 116. When the error signal is less than the carrier signal, the control module 114 operates the switches (S1-S8) to cycle energy through the matrix conversion module 108 until the error signal is greater than the carrier signal, at which point the control module 114 operates the switches (S1-S8) to release the stored energy of the inductor 110 as set forth above. In this manner, the matrix conversion module 108 alternates between cycling energy and delivering energy to the isolation module 106 as needed throughout operation of the charging system 100.

Referring again to FIG. 2 and with continued reference to FIG. 1, in an exemplary embodiment, the charging system control process 200 determines to operate the charging system 100 in a boost mode when the ratio of the DC voltage ($V_{DC}$) at the DC interface 102 to the AC voltage ($V_{AC}$) at the AC interface 112 is such that the turns ratio of the isolation module 106 should be increased in order to achieve the desired DC voltage ($V_{DC}$) at the DC interface 102. In an exemplary embodiment, the control module 114 determines to operate the charging system 100 in a boost mode when the peak voltage of the AC energy source 118 is less than the desired DC voltage ($V_{DC}$) at the DC interface 102, or in other words, when $\sqrt{2} \times V_{AC} \leq V_{DC}$ where $V_{AC}$ is the RMS voltage at the AC interface 112. For example, in accordance with one embodiment, when the charging system 100 is designed to accommodate an AC energy source voltage ($V_{AC}$) of either 120 Volts (RMS) or 240 Volts (RMS) for a nominal DC voltage of the DC energy source 116 (or desired DC voltage level) of about 250 Volts DC, the control module 114 may determine that the charging system 100 should be operated in a boost mode when the RMS voltage of the AC energy source 118 is 120 Volts to step-up the AC voltage ($V_{AC}$) to the desired DC voltage level ($V_{DC}$).

In response to determining to operate the charging system in the boost mode, the charging system control process 200 continues by increasing the turns ratio of the isolation module and operating the charging system in the boost mode (tasks 212, 214). In this regard, in an exemplary embodiment, the control module 114 configures the isolation module for the boost mode by closing (or turning ON) the switching element 144, such that the turns ratio of the isolation module 106 such that the turns ratio of the isolation module is increased to a ratio greater than or equal to 1:1. In this regard, when each set of windings 136, 138, 140, 142 has the same number of winding turns, the turns ratio of the transformer 135 and/or isolation module 106 is 1:1 when the switching element 144 is closed (or ON). The control module 114 utilizes high-frequency pulse-width modulation (PWM) to modulate or otherwise operate the switches of the matrix conversion module 108 such that the configuration of the matrix conversion module 108 and isolation module 106 operates as a high-frequency push-pull unity power factor matrix converter to provide the desired voltage at the output 120, 122 of the secondary windings 136, 138. The control module 114 implements the appropriate switching pattern and/or state machine in a similar manner as set forth above.

Referring again to FIG. 2, in an exemplary embodiment, the charging system control process 200 determines to disable operation of the charging system 100 when the ratio of the DC voltage ($V_{DC}$) at the DC interface 102 to the AC voltage ($V_{AC}$) at the AC interface 112 is such that the turns ratio of the isolation module 106 can not be adjusted (e.g., increased and/or decreased) to a turns ratio that accommodates the particular combination of energy sources 116, 118 (task 206). In accordance with one embodiment, the control module 114 determines to disable operation of the charging system 100 when the DC voltage ($V_{DC}$) is greater than $\sqrt{2} \times V_{AC}$ (plus or minus a threshold tolerance), where $V_{AC}$ is the RMS voltage at the AC interface 112. For example, in accordance with one embodiment where the charging system 100 is designed to accommodate an AC energy source voltage ($V_{AC}$) of either 120 Volts (RMS) or 240 Volts (RMS) for a nominal DC voltage of the DC energy source 116 (or desired DC voltage level) of about 250 Volts DC, the control module 114 disables operation of the charging system 100 when the RMS voltage of the AC energy source 118 is less than 80 Volts.

To briefly summarize, advantages of the system and/or method described above is that a charging system can accommodate a wide range of voltages and/or a number of possible combinations of energy source voltages. In this regard, the matrix conversion module 108 and the isolation module 106 are cooperatively configured as a single power stage that accommodates a wide voltage range and/or multiple combinations of energy sources while simultaneously achieving unity power factor, galvanic isolation, and high power density.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A charging system comprising:
a first conversion module;
a second conversion module;
an inductor connected between the second conversion module and a first node of an interface for an AC voltage; and
an isolation module coupled between the first conversion module and the second conversion module, the isolation module providing galvanic isolation between the first conversion module and the second conversion module, wherein:
the isolation module is configured for a plurality of operating modes, each operating mode of the plurality of operating modes corresponding to a respective turns ratio for the isolation module;
the isolation module comprises:
a first node coupled to the first conversion module;
a second node coupled to the first conversion module;
a first set of windings coupled between the first node and the second node;
a second set of windings coupled between the first node and the second node, the first set of windings and the second set of windings being configured electrically in parallel;
a third node coupled to the second conversion module;
a fourth node coupled to the second conversion module;
a fifth node;
a third set of windings coupled between the third node and the fifth node;
a fourth set of windings coupled between the fourth node and the fifth node; and
a switching element coupled between the fifth node and a sixth node of the second conversion module, the isolation module having a first turns ratio corresponding to a first operating mode when the switching element is open and a second turns ratio corresponding to a second operating mode of the plurality of operating modes when the switching element is closed;
the second conversion module comprises:
a seventh node;
a first set of switches coupled between the third node and the sixth node;
a second set of switches coupled between the fourth node and the sixth node;
a third set of switches coupled between the third node and the seventh node; and
a fourth set of switches coupled between the fourth node and the seventh node;
the inductor is connected between the seventh node and the first node of the interface; and
a second node of the interface is coupled to the sixth node, the interface having the AC voltage between the first node of the interface and the second node of the interface.

2. The charging system of claim 1, further comprising:
a DC energy source coupled to the first conversion module, the DC energy source having a DC voltage;
an AC energy source coupled to the second conversion module, the AC energy source having the AC voltage; and
a control module coupled to the isolation module and the second conversion module, the control module being configured to:
identify a first operating mode of the plurality of operating modes based on the DC voltage and the AC voltage;
configure the isolation module for the first operating mode; and
operate the second conversion module based on the first operating mode.

3. The charging system of claim 2, wherein the control module is configured to identify a buck mode when a peak value of the AC voltage is greater than the DC voltage.

4. The charging system of claim 3, wherein the control module is configured to decrease a turns ratio of the isolation module in response to identifying the buck mode.

5. The charging system of claim 2, wherein the control module is configured to identify a boost mode when a peak value of the AC voltage is less than the DC voltage.

6. The charging system of claim 5, wherein the control module is configured to increase a turns ratio of the isolation module in response to identifying the boost mode.

7. The charging system of claim 1, wherein:
the isolation module comprises:
a set of primary windings coupled to the second conversion module, the set of primary windings including the third set of windings and the fourth set of windings; and
a set of secondary windings coupled to the first conversion module, the set of secondary windings including the first set of windings and the second set of windings; and
the switching element is configured to adjust a turns ratio of the isolation module by adjusting the ratio of the effective number of windings of the set of secondary windings to the effective number of windings of the set of primary windings.

8. A vehicle charging system comprising:
a DC interface having a DC voltage;
an AC interface having an AC voltage;
a first conversion module coupled to the DC interface;
a second conversion module coupled to the AC interface;
an isolation module coupled between the first conversion module and the second conversion module, the isolation module comprising:
a transformer; and
a switching element coupled between the transformer and the second conversion module, wherein the transformer and the switching element are cooperatively configured to for a plurality of operating modes, each operating mode of the plurality of operating modes corresponding to a respective turns ratio of the transformer; and a control module coupled to the DC interface, the AC interface, the switching element, and the second conversion module, wherein the control module is configured to:
identify a buck mode when a peak voltage of the AC voltage is greater than the DC voltage;
decrease the turns ratio of the transformer in response to identifying the buck mode; and
operate the second conversion module in the buck mode.

9. The vehicle charging system of claim 8, further comprising:
an AC energy source coupled to the AC interface, the AC energy source having the AC voltage; and
a DC energy source coupled to the DC interface, the DC energy source having the DC voltage.

10. The vehicle charging system of claim 8, wherein the control module is configured to:
identify a boost mode when the peak voltage of the AC voltage is less than the DC voltage; and
increase the turns ratio of the transformer in response to identifying the boost mode; and
operate the second conversion module in the boost mode.

11. The vehicle charging system of claim 8, wherein the second conversion module comprises:
a first node;
a second node, wherein a primary winding stage of the transformer is coupled between the first node and the second node;
a third node coupled to the switching element and the AC interface;
a fourth node coupled to the AC interface;
a first set of switches coupled between the first node and the third node;
a second set of switches coupled between the second node and the third node;
a third set of switches coupled between the first node and the fourth node; and
a fourth set of switches coupled between the second node and the fourth node.

12. A method for charging a DC energy source from an AC energy source using a charging system configured for a plurality of operating modes, the charging system including an isolation module providing galvanic isolation between the DC energy source and the AC energy source, wherein each operating mode of the plurality of operating modes corresponds to a respective turns ratio for the isolation module, the DC energy source having a DC voltage and the AC energy source having an AC voltage, the method comprising:
identifying a boost mode of the plurality of operating modes when the DC voltage is greater than a peak value of the AC voltage;
increasing the turns ratio of the isolation module in response to identifying the boost mode; and
operating the charging system in accordance in the boost mode in response to identifying the boost mode.

13. The method of claim 12, further comprising:
identifying a buck mode of the plurality of operating modes when the voltage of the DC energy source is less than the peak value of the AC energy source; and
in response to identifying the buck mode:
decreasing the turns ratio of the isolation module; and
operating the conversion module in the buck mode.

14. A method for charging a DC energy source from an AC energy source using a charging system configured for a plurality of operating modes, the charging system including an isolation module providing galvanic isolation between the DC energy source and the AC energy source, wherein each operating mode of the plurality of operating modes corresponds to a respective turns ratio for the isolation module, the DC energy source having a DC voltage and the AC energy source having an AC voltage, the method comprising:
identifying a buck mode of the plurality of operating modes when the voltage of the DC energy source is less than a peak value of the AC energy source;
increasing the turns ratio of the isolation module in response to identifying the buck mode; and
operating the charging system in accordance in the buck mode in response to identifying the buck mode.

15. The method of claim 14, further comprising:
identifying a boost mode of the plurality of operating modes when the DC voltage is greater than the peak value of the AC voltage; and
in response to identifying the boost mode:
increasing the turns ratio of the isolation module; and
operating the conversion module in the boost mode.

16. A vehicle charging system comprising:
a DC interface having a DC voltage;
an AC interface having an AC voltage;
a first conversion module coupled to the DC interface;
a second conversion module coupled to the AC interface;
an isolation module coupled between the first conversion module and the second conversion module, the isolation module comprising:
a transformer; and
a switching element coupled between the transformer and the second conversion module, wherein the transformer and the switching element are cooperatively configured to for a plurality of operating modes, each operating mode of the plurality of operating modes corresponding to a respective turns ratio of the transformer; and
a control module coupled to the DC interface, the AC interface, the switching element, and the second conversion module, wherein the control module is configured to:
identify a boost mode when a peak voltage of the AC voltage is less than the DC voltage;
increase the turns ratio of the transformer in response to identifying the boost mode; and
operate the second conversion module in the boost mode.

* * * * *